United States Patent
Yasui

(10) Patent No.: US 11,493,098 B2
(45) Date of Patent: Nov. 8, 2022

(54) ONE-WAY CLUTCH AND ROTARY DAMPER DEVICE EQUIPPED WITH ONE-WAY CLUTCH

(71) Applicant: SIMOTEC CO., LTD., Higashiosaka (JP)

(72) Inventor: Yorikazu Yasui, Nagahama (JP)

(73) Assignee: SIMOTEC CO., LTD., Higashiosaka (JP)

( * ) Notice: Subject to any disclaimer, the term of this patent is extended or adjusted under 35 U.S.C. 154(b) by 276 days.

(21) Appl. No.: 16/647,218

(22) PCT Filed: Dec. 27, 2017

(86) PCT No.: PCT/JP2017/046915
§ 371 (c)(1),
(2) Date: Mar. 13, 2020

(87) PCT Pub. No.: WO2019/053909
PCT Pub. Date: Mar. 21, 2019

(65) Prior Publication Data
US 2020/0256405 A1 Aug. 13, 2020

(30) Foreign Application Priority Data
Sep. 14, 2017 (JP) ............................. JP2017-176913

(51) Int. Cl.
*F16D 41/18* (2006.01)
*F16F 9/12* (2006.01)

(52) U.S. Cl.
CPC ................ *F16D 41/18* (2013.01); *F16F 9/12* (2013.01); *F16F 2222/12* (2013.01); *F16F 2232/02* (2013.01)

(58) Field of Classification Search
CPC ...... F16F 9/12; F16F 2222/12; F16F 2232/02; F16F 9/006; F16F 9/19; F16F 9/20; F16D 41/18
(Continued)

(56) References Cited

U.S. PATENT DOCUMENTS 4,346,749 A * 8/1982 Singletary ................. E06B 9/90
192/16
5,088,581 A * 2/1992 Duve ....................... F16D 41/18
192/107 M (Continued)

FOREIGN PATENT DOCUMENTS

JP S30004909 Y1 4/1955
JP S50119151 A 9/1975
(Continued)

OTHER PUBLICATIONS

English Translation of JPS30004909; Applicant, Hiroshi Taguchi; Published on Apr. 7, 1955; 2 pages.
(Continued)

*Primary Examiner* — Robert A. Siconolfi
*Assistant Examiner* — San M Aung
(74) *Attorney, Agent, or Firm* — Cantor Colburn LLP

(57) ABSTRACT

Provided are a one-way clutch and a rotary damper device equipped with the one-way clutch, in which size reduction can be achieved. A claw of a slide member has a retreat surface that abuts against an internal tooth of an outer member when the outer member turns toward one side with respect to an inner member and an engagement surface that abuts against the internal tooth when the outer member turns toward the other side with respect to the inner member. When the internal tooth and the retreat surface abut against each other, the slide member slides in a sliding direction, thus causing the claw to retreat from the internal tooth, and
(Continued)

the outer member turns independently of the inner member. When the internal tooth and the engagement surface abut against each other, the internal tooth and the engagement surface are engaged, and the outer member and the inner member integrally turn.

6 Claims, 9 Drawing Sheets

(58) Field of Classification Search
 USPC .......................................................... 188/291
 See application file for complete search history.

(56) References Cited

U.S. PATENT DOCUMENTS

| | | | | |
|---|---|---|---|---|
| 6,102,179 | A * | 8/2000 | Hodson | F16D 41/18 |
| | | | | 192/41 R |
| 8,517,019 | B2 * | 8/2013 | Brewer | A61M 15/009 |
| | | | | 128/200.23 |
| 9,103,390 | B2 | 8/2015 | Shimozaki | |
| 2009/0308385 | A1 * | 12/2009 | Brewer | A61M 15/009 |
| | | | | 128/203.12 |
| 2011/0299366 | A1 * | 12/2011 | Giacobino | F16D 41/18 |
| | | | | 192/45.1 |
| 2014/0083809 | A1 * | 3/2014 | Shimozaki | F16F 9/12 |
| | | | | 192/46 |
| 2015/0267480 | A1 * | 9/2015 | Meek | E21B 17/1071 |
| | | | | 29/464 |

FOREIGN PATENT DOCUMENTS

| | | |
|---|---|---|
| JP | 197920785 U | 2/1979 |
| JP | 60013518 Y | 4/1985 |
| JP | H10501869 A | 2/1998 |
| JP | 0005666376 B2 | 2/2015 |

OTHER PUBLICATIONS

English Translation of JPS50119151A; Applicant, Saburou Handa; Published on Sep. 18, 1975; 2 pages.
International Search Report for International Application No. PCT/JP2017/046915; dated Apr. 3, 2018.

* cited by examiner

ONE-WAY CLUTCH AND ROTARY DAMPER DEVICE EQUIPPED WITH ONE-WAY CLUTCH

CROSS REFERENCE TO RELATED APPLICATIONS

This is the U.S. national stage of application No. PCT/JP2017/046915, filed on Dec. 27, 2017. Priority under 35 U.S.C. § 119(a) and 35 U.S.C. § 365(b) is claimed from Japanese Application No. 2017-176913, filed Sep. 14, 2017, the disclosure of which is also incorporated herein by reference.

TECHNICAL FIELD

The present invention relates to a one-way clutch and a rotary damper device equipped with the one-way clutch.

BACKGROUND ART

Conventionally, there is known a rotary damper that is provided at an opening/closing of a door or the like and is used to relieve an impact by slowly operating the door or the like biased in one of the opening and closing directions. In such a rotary damper, in order to generate a damping force only for turning in one direction, a rotary damper device equipped with a one-way clutch may be configured in combination with a one-way clutch.

For example, in a rotary damper device equipped with a one-way clutch described in Patent Literature 1, the one-way clutch is combined with the rotary damper device. The one-way clutch has an inner member coupled to a rotor shaft of a rotary damper and turns integrally with the rotor shaft, an outer member that accommodates the inner member such that the inner member can relatively turn, and a pair of planetary gears interposed between the inner member and the outer member.

In this one-way clutch, the planetary gear meshes with an inner gear formed on an inner peripheral surface of the outer member, and is accommodated in a recess formed in the inner member. The recess of the inner member includes a first wall which is disposed on one side in a turning direction of the inner member with respect to the planetary gear, and extends outward in a radial direction of the inner member, and a second wall which is disposed on the other side in the turning direction of the inner member with respect to the planetary gear, whose length extending outward in the radial direction of the inner member is about half of that of the first wall, and which has a corner at the extended end.

When the outer member turns toward one side (forward direction) with respect to the inner member, the planetary gear turned by the inner gear of the outer member abuts against the first wall, and idles while sliding on the first wall. In this case, since the first wall extends to the outside in the radial direction from a location where a tooth tip of the planetary gear abuts, the planetary gear idles on the first wall without meshing with an outer end of the first wall. As a result, even if the outer member turns, the inner member does not turn.

In contrast, when the outer member turns toward the other side (backward direction) with respect to the inner member, the planetary gear turned by the inner gear of the outer member moves toward the second wall, meshes with the corner of the second wall, and cannot turn. As a result, the inner member is engaged with the outer member via the planetary gear and turns integrally with the outer member.

CITATIONS LIST

Patent Literature

Patent Literature 1: JP-B2 5666376 Gazette SUMMARY OF INVENTION

Technical Problems

In the above-described one-way clutch, a plurality of planetary gears are interposed between the outer member and the inner member, and the planetary gears allow switching between a state in which the outer member and the inner member are engaged and a state in which the outer member and the inner member are not engaged.

However, since the one-way clutch described in Patent Literature 1 has a configuration in which the plurality of planetary gears are accommodated inside the outer member, the one-way clutch is large as a whole.

Accordingly, the present invention provides a one-way clutch and a rotary damper device equipped with the one-way clutch that can reduce the size of the one-way clutch.

Solutions to Problems

A one-way clutch and a rotary damper device equipped with the one-way clutch that solve the above problem have the following characteristics.

That is, the one-way clutch provided in the rotary damper device equipped with the one-way clutch includes an inner member that has a first insertion hole formed along a direction of an axis, an outer member that has a cylindrical shape, accommodates the inner member such that the inner member is turnable about the axis, and has a plurality of internal teeth which project inward in a radial direction from an inner peripheral surface facing an outer peripheral surface of the inner member, and a slide member that is provided on the inner member such that the slide member is slidable in the radial direction perpendicular to the direction of the axis and has claws which are provided at both ends in the radial direction and project outward in the radial direction, in which a dimension between a front end of one of the claws and a front end of the other of the claws is greater than a diameter of a circle that passes through front ends of the plurality of internal teeth and is centered on the axis, each of the claws has a retreat surface that abuts against each of the plurality of internal teeth when the outer member turns toward one side with respect to the inner member, and an engagement surface that abuts against each of the plurality of internal teeth when the outer member turns toward the other side with respect to the inner member, and when each of the plurality of internal teeth and the retreat surface abut against each other, the slide member slides in a sliding direction to cause each of the claws to retreat from each of the plurality of internal teeth, and the outer member turns independently of the inner member, and when each of the plurality of internal teeth and the engagement surface abut against with each other, each of the plurality of internal teeth and the engagement surface are engaged with each other and the outer member and the inner member integrally turn.

Furthermore, the retreat surface is formed as an inclined surface that is inclined toward a downstream side in a turning direction of the outer member toward the one side as proceeding outward in the radial direction, and the engagement surface is formed as an inclined surface that is inclined toward an upstream side in a turning direction of the outer member toward the other side as proceeding toward a surface perpendicular to the turning direction of the outer member toward the other side or as proceeding outward in the radial direction.

Furthermore, each of the plurality of internal teeth has a first surface that abuts against each of the claws when the outer member turns toward the one side with respect to the inner member, and a second surface that abuts against each of the claws when the outer member turns toward the other side with respect to the inner member, the first surface is formed as an inclined surface that is inclined toward the downstream side in the turning direction of the outer member toward the one side as proceeding outward in the radial direction, and the second surface is formed as an inclined surface that is inclined toward the upstream side in the turning direction of the outer member toward the other side as proceeding toward a surface perpendicular to the turning direction of the outer member toward the other side or as proceeding outward in the radial direction.

Furthermore, a rotary damper device equipped with a one-way clutch, the rotary damper device includes the one-way clutch according to any one of aspects 1 to 3, and a rotary damper device that includes a housing, a rotor having a rotor blade that is turnably accommodated in the housing and a rotor shaft that extends along a turning axis of the rotor blade and is inserted into a first insertion hole of the one-way clutch, and a viscous body that is enclosed in the housing and imparts turning resistance to the rotor blade, in which the inner member of the one-way clutch and the rotor of the rotary damper device are integrally turnable.

Furthermore, the slide member has a second insertion hole formed along the direction of the axis, and the rotor shaft is inserted into the second insertion hole.

Furthermore, the second insertion hole has a guide surface that guides the slide member in the sliding direction.

Advantageous Effects of Invention

According to the present invention, it is possible to reduce the size of the one-way clutch and the rotary damper device equipped with the one-way clutch.

BRIEF DESCRIPTION OF DRAWINGS

FIG. 5A illustrates a state in which one claw is located outside in a radial direction of a circle C, and an internal tooth abuts against the one claw, and FIG. 5B is a view illustrating a state in which the one claw is pressed by the internal tooth and retreats to the inside in the radial direction.

FIG. 7A illustrates a state in which the one claw is located outside the circle C in the radial direction, and FIG. 7B is a view illustrating the state in which the internal tooth is engaged with the one claw.

DESCRIPTION OF EMBODIMENTS

Figure 1:
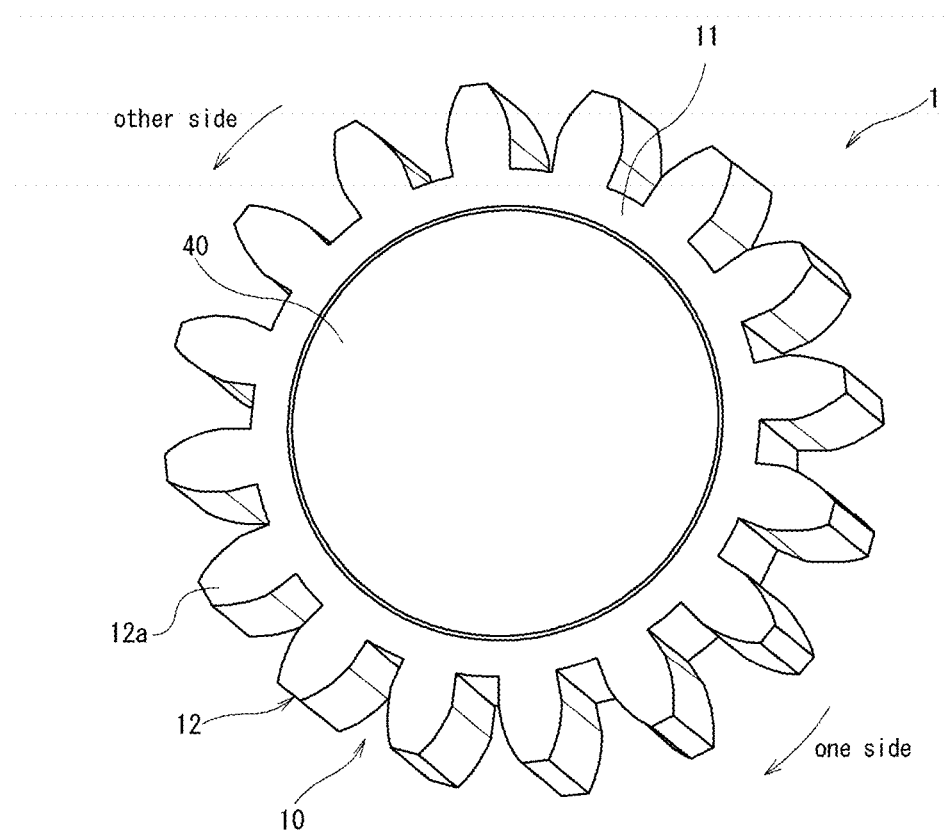
FIG. 1 is a perspective view illustrating a one-way clutch viewed from a lid member side.
Figure 2:
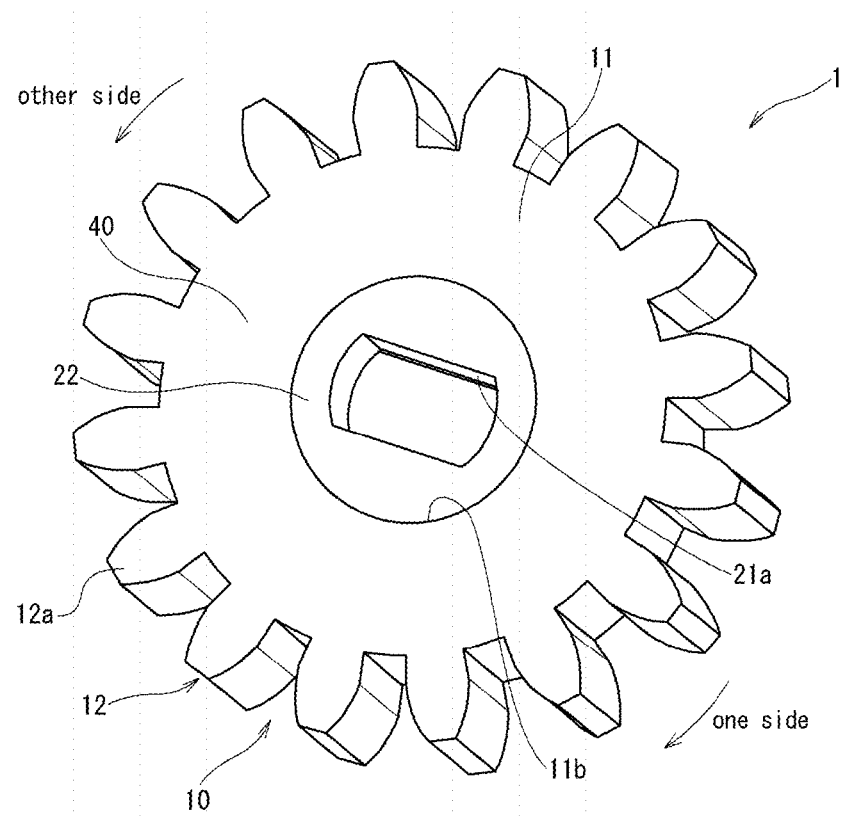
FIG. 2 is a perspective view illustrating the one-way clutch as viewed from a bottom plate side of an outer body.

Next, modes for carrying out the present invention will be described with reference to the accompanying drawings.

First Embodiment of One-Way Clutch

A one-way clutch 1 illustrated in FIGS. 1 to 4 is an embodiment of a one-way clutch according to the present invention, and includes an outer member 10, an inner member 20, a slide member 30, and a lid member 40.

The outer member 10 has an outer body 11 formed in a bottomed cylindrical shape having a bottom plate 11a on one end side in a direction of an axis P (see FIG. 4) and having an opening on the other end side in the direction of the axis P, an external teeth gear 12 having a plurality of external teeth 12a formed on an outer peripheral surface of the outer body 11 and projecting outward in the radial direction, and a plurality of internal teeth 13 formed on an inner peripheral surface of the body 11 and projecting inward in the radial direction. A circular fitting hole 11b penetrating the bottom plate 11a in the direction of the axis P is formed. The hole center of the fitting hole 11b matches the axis P. The radial direction of the outer body 11 is a direction perpendicular to the direction of the axis P.

Figure 3:
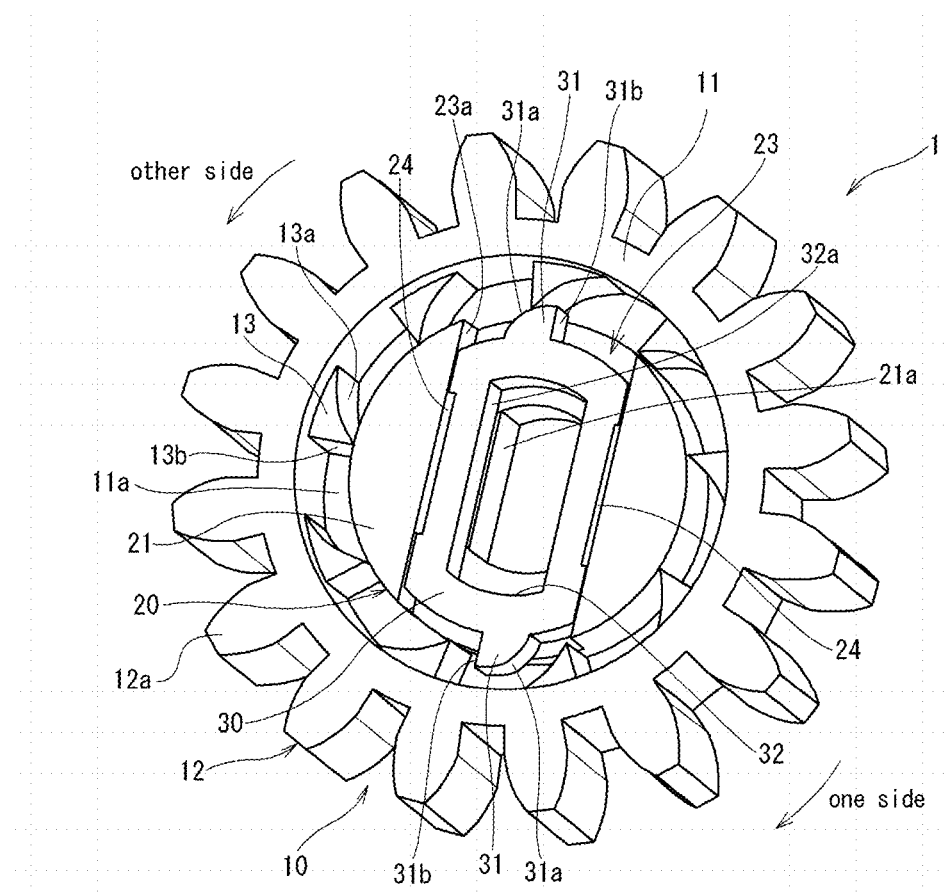
FIG. 3 is a perspective view illustrating the inside of the outer body in the one-way clutch.
Figure 4:
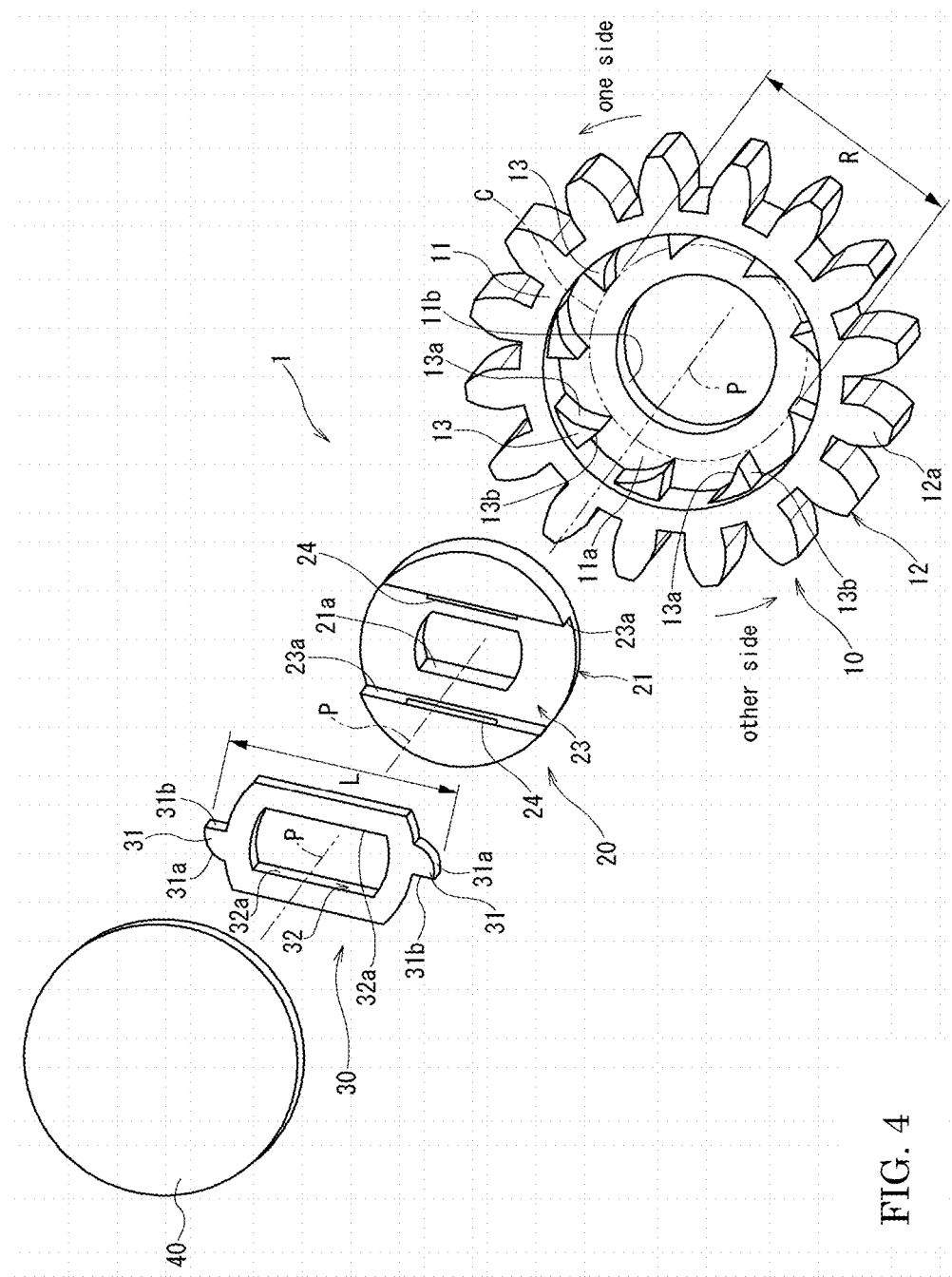
FIG. 4 is an exploded perspective view illustrating the one-way clutch.

The outer member 10 is configured to be turnable toward one side (clockwise direction in FIGS. 1, 3, and 4) about the axis P and toward the other side opposite to the one side (counterclockwise direction in FIGS. 1, 3, and 4).

The internal tooth 13 has a first surface 13a disposed on a downstream side in a turning direction of the outer member 10 toward the one side, and a second surface 13b disposed on an upstream side with respect to the first surface 13a in the turning direction of the outer member 10 toward the one side. The first surface 13a is formed as an inclined surface that is inclined toward the downstream side in the turning direction of the outer member 10 toward the one side as proceeding outward in the radial direction. The first surface 13a is formed in an arc shape that is concave toward the outside. The second surface 13b is formed on a surface perpendicular to the turning direction of the outer member 10 toward the other side.

The internal teeth 13 are disposed at equal intervals along a peripheral direction of the outer member 10. The internal teeth 13 are formed such that the center of a circle C passing through a front end of each internal tooth 13 (a boundary between the first surface 13a and the second surface 13b) is the axis P.

The inner member 20 has an inner body 21 formed of a disk-shaped member, and a columnar fitting protrusion 22 (see FIGS. 2 and 9) that projects from one surface of the inner body 21 to the one end side in the direction of the axis P, and a groove 23 formed on the other surface of the inner body 21. The inner body 21 and the fitting protrusion 22 are coaxially disposed, and are configured to be integrally turnable about the axis P.

The groove 23 is a groove extending along the radial direction of the inner body 21, and is formed from one end to the other end of the inner body 21 in an extending direction of the groove 23.

A first insertion hole 21a that penetrates the inner member 20 (the inner body 21 and the fitting protrusion 22) in the direction of the axis P is formed in a portion of the inner member 20 where the groove 23 is formed.

The first insertion hole 21a is formed along the direction of the axis P. The first insertion hole 21a is formed in a long hole shape in which the extending direction of the groove 23 is a longitudinal direction. The axis P is the axis of the first insertion hole 21a and passes through the center of the first insertion hole 21a. A shaft such as a rotor shaft of a rotary damper device can be inserted into the first insertion hole 21a.

The groove 23 has a pair of side surfaces 23a formed along the extending direction of the groove 23. A guide piece 24 is formed on each side surface 23a. The guide piece 24 is formed along the extending direction of the groove 23.

In the inner member 20, an outer diameter of the inner body 21 is formed so as to be approximately the same as or slightly smaller than a diameter of the circle C.

The inner member 20 is accommodated in the outer member 10, and the fitting protrusion 22 of the inner member 20 accommodated in the outer member 10 is turnably fitted in the fitting hole 11b of the outer member 10. The inner member 20 and the outer member 10 are configured to be relatively turnable about the axis P. The outer peripheral surface of the inner body 21 accommodated in the outer member 10 faces the internal teeth 13 of the outer member 10.

The slide member 30 is formed of a plate-like member, and is provided in the groove 23 of the inner member 20 so as to be slidable along the extending direction of the groove 23. That is, the slide member 30 is configured to be slidable in the radial direction of the inner member 20 perpendicular to the direction of the axis P.

The guide piece 24 formed on the side surface 23a of the groove 23 guides the slide member 30 in the sliding direction and restricts movement of the slide member 30 in the direction of the axis P. The slide member 30 is configured to be turnable integrally with the inner member 20 about the axis P.

At both ends of the slide member 30 in the sliding direction, claws 31 projecting outward in the radial direction from the both ends are formed.

The claw 31 has a retreat surface 31a disposed on the upstream side in the turning direction of the outer member 10 toward the one side and an engagement surface 31b disposed on the downstream side with respect to the retreat surface 31a in the turning direction of the outer member 10 toward the one side. The retreat surface 31a is formed as an inclined surface that is inclined toward the downstream side in the turning direction of the outer member 10 toward the one side as proceeding outward in the radial direction. The retreat surface 31a is formed in an arc shape that is convex toward the outside. The engagement surface 31b is formed on a surface perpendicular to the turning direction of the outer member 10 toward the other side.

As illustrated in FIG. 4, a dimension L between a front end of one claw 31 and a front end of the other claw 31 in the slide member 30 is formed greater than a diameter R of the circle C. Therefore, in the one-way clutch 1, at least any one of the claws 31 is located outside the circle C in the radial direction regardless of the slide position of the slide member 30 relative to the inner member 20.

The slide member 30 is formed with a second insertion hole 32 penetrating in the direction of the axis P. The second insertion hole 32 is formed along the direction of the axis P. The second insertion hole 32 is formed in a long hole shape in which the extending direction of the groove 23 in the inner member 20 is the longitudinal direction. A dimension of the second insertion hole 32 in the longitudinal direction is formed greater than a longitudinal dimension of the first insertion hole 21a. In the second insertion hole 32, a pair of surfaces extending in the longitudinal direction is configured as guide surfaces 32a, 32a, and the guide surfaces 32a, 32a are disposed in parallel to each other. A shaft such as the rotor shaft of the rotary damper device can be inserted into the second insertion hole 32.

The lid member 40 is formed of a disk-shaped member, and is a member that closes the opening of the outer body 11. The lid member 40 closes the opening of the outer body 11 in a state in which the inner member 20 is accommodated in the outer member 10 and the slide member 30 is provided on the inner member 20.

[Operation of One-Way Clutch]

The one-way clutch 1 configured as described above operates as follows.

Note that in the following description of the operation of the one-way clutch 1, out of the claws 31 formed at both ends of the slide member 30, one claw 31 is referred to as a claw 311 and the other claw 31 is referred to as a claw 312. Furthermore, the internal teeth 13 of the outer member 10 are appropriately referred to as an internal tooth 131, an internal tooth 132, an internal tooth 133, and an internal tooth 134 in the order of abutting against the claws 31 when the outer member 10 is turned toward the one side.

A case where the outer member 10 turns toward the one side with respect to the inner member 20 will be described.

Figure 5A:
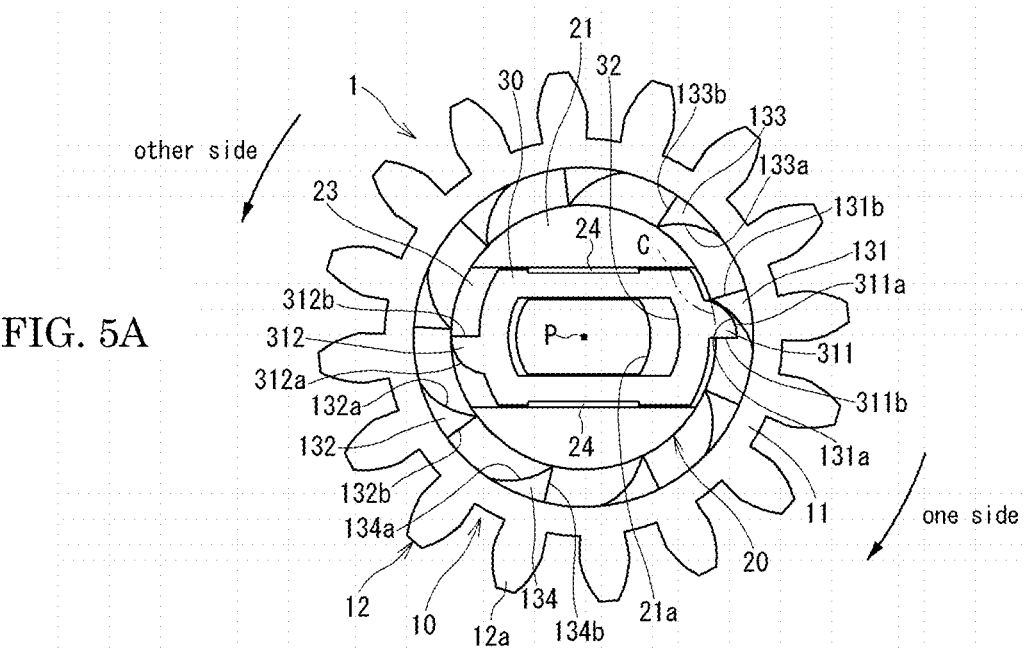
FIGS. 5A and 5B are views illustrating operation of the one-way clutch when an outer member turns toward one side with respect to an inner member.

FIG. 5A illustrates a state in which the claw 311 is located outside the circle C in the radial direction, and the claw 312 does not protrude to the outside of the circle C in the radial direction. In the state illustrated in FIG. 5A, the internal tooth 131 is located upstream of the claw 311 in the turning direction of the outer member 10 toward the one side.

When the outer member 10 turns toward the one side with respect to the inner member 20 in this state, the internal tooth 131 of the outer member 10 abuts against the claw 311. When the outer member 10 turns toward the one side after the internal tooth 131 abuts against the claw 311, the claw 311 is pressed by the internal tooth 131, and the claw 311 retreats from the internal tooth 131 inward in the radial direction, and the slide member 30 slides toward the claw 312.

In this case, the first surface 131a of the internal tooth 131 abuts against the retreat surface 311a of the claw 311; however, since the retreat surface 311a is formed as an inclined surface inclined toward the downstream side in the turning direction of the outer member 10 toward the one side as proceeding outward in the radial direction, the claw 311 can smoothly retreat from the internal tooth 131 when the outer member 10 turns toward the one side.

In addition, since the first surface 131a of the internal tooth 131 is formed as an inclined surface inclined toward the downstream in the turning direction of the outer member 10 toward the one side as proceeding outward in the radial direction, the claw 311 can more smoothly retreat from the internal tooth 131.

Figure 5B:
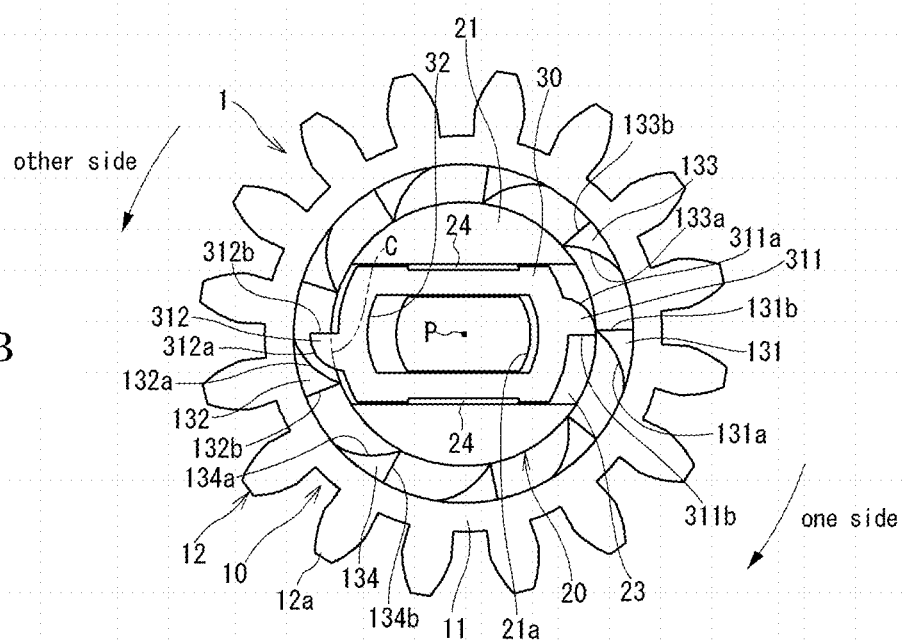

As illustrated in FIG. 5B, when the claw 311 is pressed by the internal tooth 131 of the outer member 10 turning toward the one side, the slide member 30 slides toward the claw 312 until the claw 311 does not protrude to the outside of the circle C.

After the slide member 30 slides until the claw 311 does not protrude to the outside of the circle C, the internal tooth 131 does not mesh with the claw 311 and moves downstream of the turning direction of the outer member 10 toward the one side with respect to the claw 311.

When the slide member 30 is in a slide position where the claw 311 does not protrude to the outside of the circle C, the claw 312 protrudes to the outside of the circle C.

Figure 6:
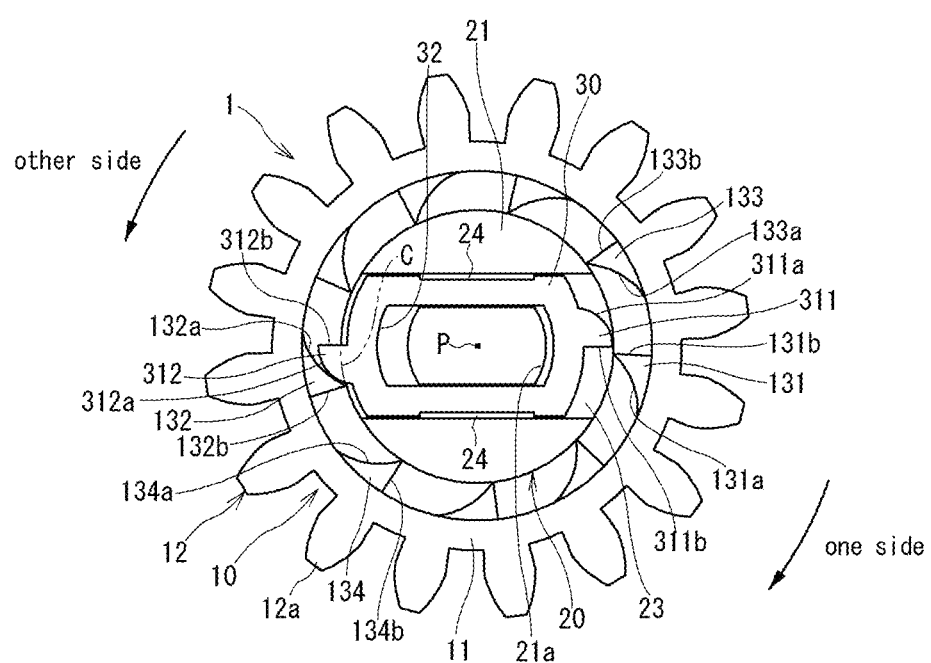
FIG. 6 is a view illustrating operation of the one-way clutch in a case where the outer member turns toward the one side with respect to the inner member, and is a view illustrating a state in which the other claw located outside the circle C in the radial direction abuts against an internal tooth.

As illustrated in FIG. 6, when the outer member 10 further turns toward the one side, the internal tooth 132 of the outer member 10 abuts against the claw 312 located on the side opposite to the claw 311. When the outer member 10 turns toward the one side after the internal tooth 132 abuts against the claw 312, the claw 312 is pressed by the internal tooth 132, the claw 312 retreats from the internal tooth 132 inward in the radial direction, and the slide member 30 slides toward the claw 311.

The slide member 30 slides until the claw 312 does not protrude to the outside of the circle C. Then, the internal tooth 132 does not mesh with the claw 312 and moves downstream of the turning direction of the outer member 10 toward the one side with respect to the claw 312.

Thereafter, when the outer member 10 further turns toward the one side, the internal tooth 133 of the outer member 10 abuts against the claw 311, and the slide member 30 slides toward the claw 312 until the claw 311 does not protrude to the outside of the circle C. When the outer member 10 further turns toward the one side, the internal tooth 134 of the outer member 10 abuts against the claw 312, and the slide member 30 slides toward the claw 311 until the claw 312 does not protrude to the outside of the circle C.

Thus, in a case where the outer member 10 turns toward the one side, the internal teeth 13 of the outer member 10 alternately abut against the claw 311 and the claw 312 of the slide member 30. When the internal teeth 13 abut against the claws 311, 312, the claws 311, 312 retreat from the internal teeth 13 and the slide member 30 slides alternately toward the claw 312 and toward the claw 3111 in the sliding direction. Accordingly, the outer member 10 turns independently of the inner member 20 without the internal teeth 13 of the outer member 10 engaging with the claws 311, 312 of the slide member 30.

Next, a case where the outer member 10 turns toward the other side with respect to the inner member 20 will be described.

Figure 7A:
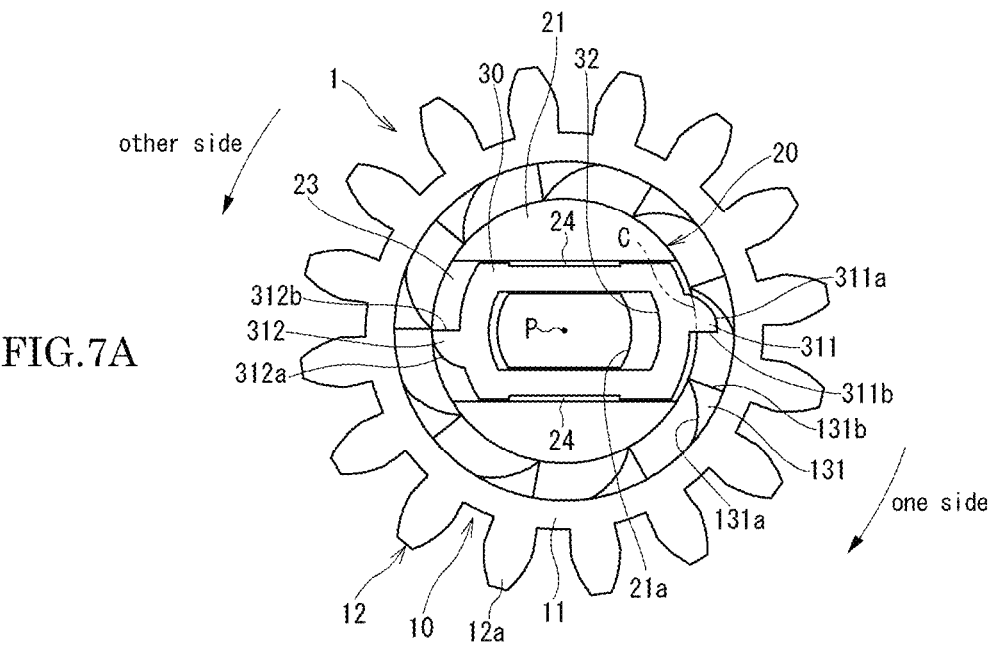
FIGS. 7A and 7B are views illustrating operation of the one-way clutch in a case where the outer member turns toward the other side with respect to the inner member.

FIG. 7A illustrates a state in which the claw 311 is located outside the circle C, and the claw 312 does not protrude to the outside of the circle C. In the state illustrated in FIG. 7A, the internal tooth 131 is located upstream of the claw 311 in the turning direction of the outer member 10 toward the other side.

Figure 7B:
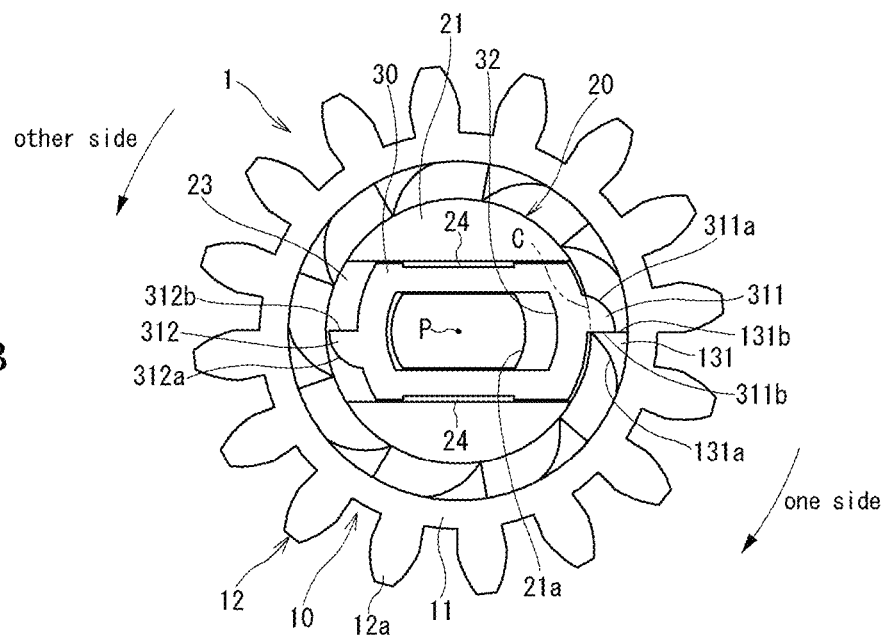

When the outer member 10 turns toward the other side with respect to the inner member 20 from this state, as illustrated in FIG. 7B, the internal tooth 131 of the outer member 10 abuts against the claw 311 and the internal tooth 131 and the claw 311 are engaged.

When the outer member 10 turns toward the other side after the internal tooth 131 and the claw 311 are engaged, the slide member 30 does not slide in the sliding direction, the engagement state between the internal tooth 131 and the claw 311 is maintained, and the inner member 20 turns integrally with the outer member 10.

In this case, the second surface 131b of the internal tooth 131 abuts against the engagement surface 311b of the claw 311. Since the engagement surface 311b is formed as a surface perpendicular to the turning direction of the outer member 10 toward the other side, when the outer member 10 turns toward the other side with respect to the inner member 20, the engagement state between the internal tooth 131 and the claw 31 is easily maintained.

Further, since the second surface 131b of the internal tooth 131 is formed as a surface perpendicular to the turning direction of the outer member 10 toward the other side, the internal tooth 131 and the claw 311 can be reliably engaged.

In the one-way clutch 1, the dimension L between the front end of the claw 311 and the front end of the claw 312 in the slide member 30 is formed greater than the diameter R of the circle C, and at least one of the claws 311, 312 is located outside the circle C. Therefore, in a case where the outer member 10 turns toward the other side with respect to the inner member 20, the engagement surface 311b of the claw 311 or the engagement surface 312b of the claw 312 is reliably engaged with the second surface 13b of the internal tooth 13 and therefore the outer member 10 and the inner member 20 can turn integrally, regardless of the slide position of the slide member 30.

In the one-way clutch 1, the claws 31 of the slide member 30 slidably provided on the inner member 20 allow switching between the state in which the outer member 10 and the inner member 20 are engaged with each other, and the state in which the outer member 10 and the inner member 20 are not engaged with each other. Therefore, as compared to, for example, the case of configuring a one-way clutch in which a plurality of planetary gears are accommodated inside an outer member, it is possible to reduce the size of the one-way clutch 1. In particular, it is possible to make the dimension of the one-way clutch 1 in the direction of the axis P smaller.

[Rotary Damper Device Equipped with One-Way Clutch]

Next, a rotary damper device 100 with a one-way clutch will be described.

Figure 8:
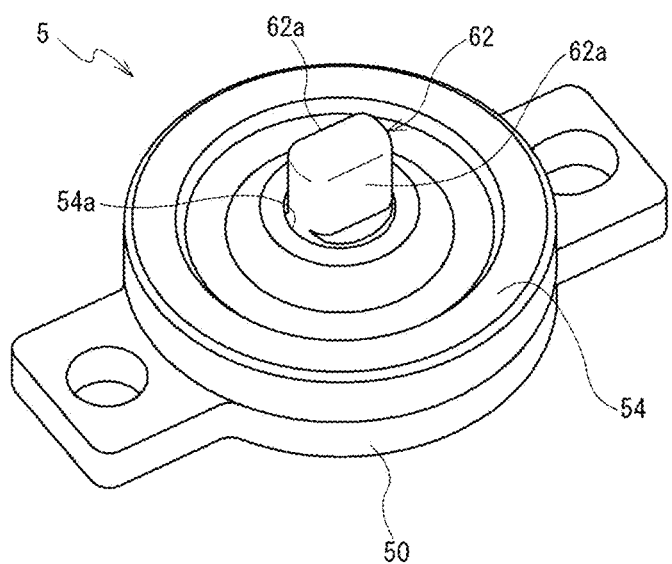
FIG. 8 is a perspective view illustrating a rotary damper device.

The rotary damper device 100 equipped with a one-way clutch can be configured by mounting the one-way clutch 1 on a rotary damper device 5 illustrated in FIG. 8.

Figure 9:
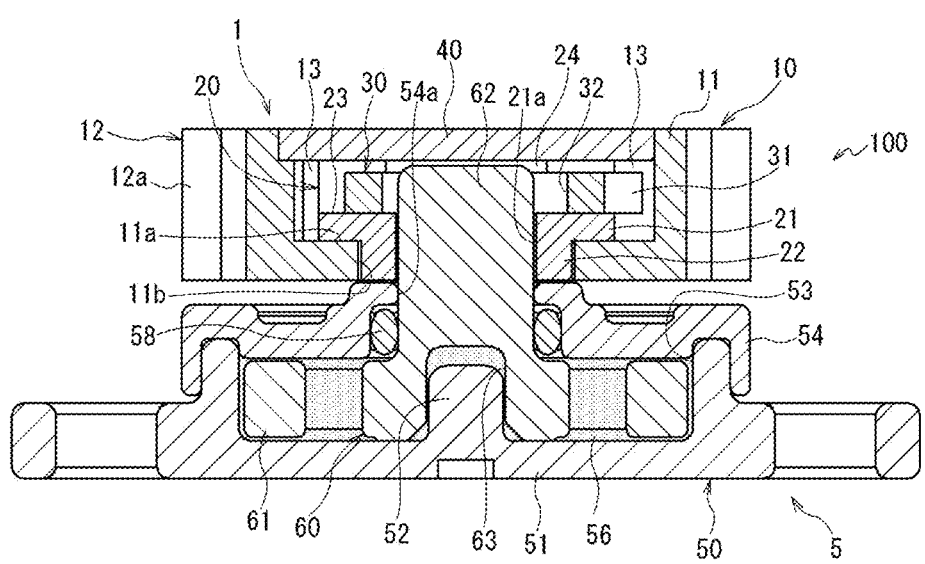
FIG. 9 is a side sectional view illustrating the rotary damper device equipped with the one-way clutch.

As illustrated in FIGS. 8 and 9, the rotary damper device 5 includes a housing 50, a rotor 60, a lid body 54, and a viscous body 56.

The housing 50 is formed in a bottomed cylindrical shape and has a bottom surface 51. A columnar support shaft 52 that projects along the axis of the housing 50 is formed at the center of the bottom surface 51. An opening 53 is formed at the end of the housing 50 opposite to the bottom surface 51 in the direction of the axis.

The rotor 60 has a rotor blade 61 formed in a substantially disk shape, and a rotor shaft 62 extending from the center of the rotor blade 61 along the direction of the turning axis.

The rotor blade 61 is turnably accommodated in the housing 50. A bearing hole 63 is formed on the opposite side of the rotor shaft 62 in the center of the rotor blade 61. Since the bearing hole 63 is turnably fitted to the support shaft 52, the rotor 60 is turnably supported by the housing 50.

The lid body 54 closes the opening 53 of the housing 50. A through hole 54a that is a circular hole coaxial with the support shaft 52 is formed at the center of the lid body 54.

The rotor shaft 62 projects from the rotor blade 61 accommodated in the housing 50 to the outside of the housing 50 through the through hole 54a. A portion of the rotor shaft 62 that projects outside the housing 50 is formed in a substantially quadrangular prism shape.

The viscous body 56 is enclosed in the housing 50. The viscous body 56 is made of a fluid having viscosity such as silicone oil. The viscous body 56 imparts turning resistance to the rotor blade 61 that is accommodated in the housing 50 and turns.

The magnitude of the turning resistance imparted to the rotor blade 61 can be adjusted by appropriately changing the viscosity of the viscous body 56 or the shape of the rotor blade 61.

A seal member 58 such as an O-ring is interposed between the rotor shaft 62 and the lid body 54 to prevent the viscous body 56 from leaking from between the rotor shaft 62 and the lid body 54.

The rotary damper device 100 equipped with the one-way clutch is configured by inserting the rotor shaft 62 of the rotary damper device 5 configured as described above into the first insertion hole 21a in the inner member 20 of the one-way clutch 1 and the second insertion hole 32 in the slide member 30 of the one-way clutch 1 and connecting the rotary damper device 5 and the one-way clutch 1.

The hole shape of the first insertion hole 21a in the inner member 20 is formed in a shape corresponding to the shaft shape of the rotor shaft 62, and the inner member 20 and the rotor shaft 62 are integrally turnable about the turning axis of the rotor shaft 62. In a state where the rotor shaft 62 is inserted into the first insertion hole 21a, the turning axis of the rotor shaft 62 and the axis P of the one-way clutch 1 match.

The cross-sectional shape of the rotor shaft 62 viewed from the turning axis direction of the rotor shaft 62 is formed in a substantially rectangular shape, and a pair of longitudinal surfaces 62a, 62a extending in the longitudinal direction is disposed in parallel to each other.

The dimension in a lateral direction of the rotor shaft 62 and the dimension in the lateral direction of the second insertion hole 32 are formed to be substantially the same.

In a state where the rotor shaft 62 is inserted into the second insertion hole 32, the longitudinal surface 62a of the rotor shaft 62 and the guide surface 32a of the second insertion hole 32 are in sliding contact.

Therefore, when the slide member 30 slides with respect to the inner member 20, the slide operation of the slide member 30 is guided by the guide surface 32a of the second insertion hole 32 into which the rotor shaft 62 is inserted. As a result, it is possible to stabilize the sliding operation when the slide member 30 slides.

That is, the guide surface 32a of the second insertion hole 32 functions as a guide surface that guides the slide member 30 in the sliding direction.

In the rotary damper device 100 equipped with the one-way clutch, the rotor shaft 62 of the rotary damper device 5 is inserted not only into the first insertion hole 21a of the inner member 20 but also into the second insertion hole 32 of the slide member 30. Therefore, it is possible to keep the overall dimension in the height direction (direction of the axis P) small.

In the rotary damper device 100 equipped with the one-way clutch configured as described above, when the outer member 10 is turned toward the one side with respect to the inner member 20, the outer member 10 turns independently of the inner member 20, and the inner member 20 does not turn.

In this case, since also the rotor shaft 62 connected to the inner member 20 does not turn, the outer member 10 turns without being given turning resistance.

In contrast, when the outer member 10 is turned toward the other side with respect to the inner member 20, the outer member 10 and the inner member 20 turn integrally. When the inner member 20 turns, the rotor shaft 62 turns integrally with the inner member 20. Therefore, the turning resistance imparted to the rotor shaft 62 when the rotor shaft 62 turns is also transmitted to the outer member 10.

Thus, when the outer member 10 turns toward the other side with respect to the inner member 20, the turning resistance is imparted to the outer member 10.

In this case, in the one-way clutch 1, the outer member 10 and the inner member 20 can reliably turn integrally regardless of the slide position of the slide member 30. Therefore, it is possible to reliably apply the load in the turning direction generated by the rotary damper device 100 to the outer member 10.

In addition, since the one-way clutch 1 can be configured in a small size, it is possible to reduce the overall size of the rotary damper device 100 equipped with the one-way clutch configured by connecting the one-way clutch 1 to the rotary damper device 5.

Second Embodiment of One-Way Clutch

The one-way clutch 1 can also be configured as follows.

A one-way clutch 7 of the present embodiment has an outer member 70, an inner member 80, and a slide member 90 in lieu of the outer member 10, the inner member 20, and the slide member 30 according to the one-way clutch 1 of the first embodiment.

Figure 10:
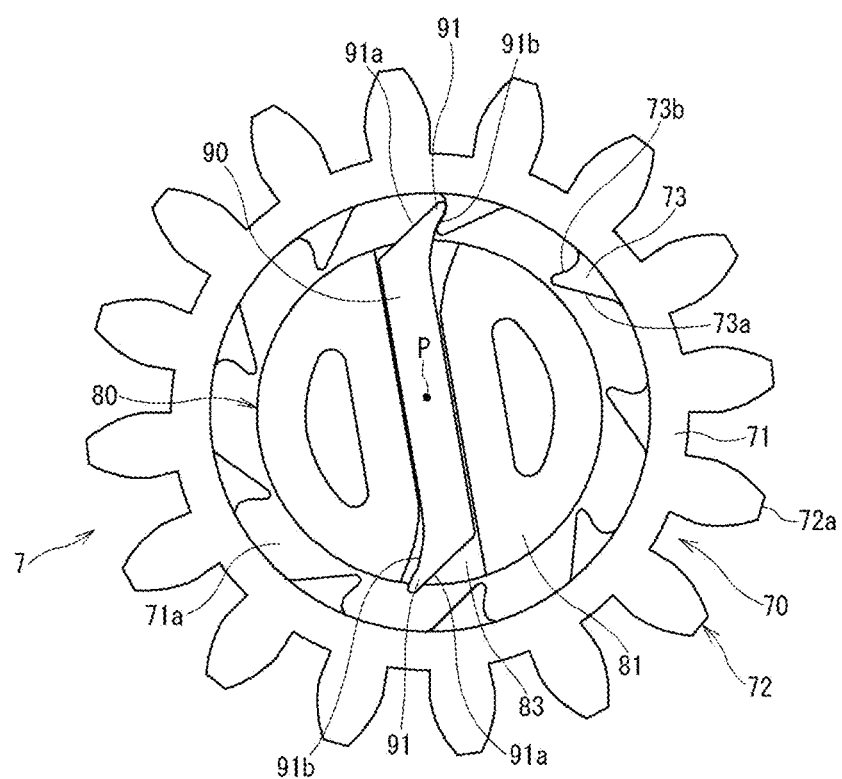
FIG. 10 is a view illustrating a second embodiment of a one-way clutch.

As illustrated in FIG. 10, the outer member 70 is formed in a bottomed cylindrical shape having an outer body 71 that has a bottom plate 71a on one end side in a direction of an axis P and having an opening on the other end side in the direction of the axis P, and accommodates the inner member 80 such that the inner member 80 can turn about the axis P, an external teeth gear 72 that has a plurality of external teeth 72a formed on an outer peripheral surface of the outer body 71 and projecting outward in a radial direction, and a plurality of internal teeth 73 that are formed on an inner peripheral surface of the body 71 and project inward in the radial direction.

The internal tooth 73 has a first surface 73a disposed on a downstream side in a turning direction of the outer member 70 toward one side, and a second surface 73b disposed on an upstream side with respect to the first surface 73a in the turning direction of the outer member 70 toward the one side. The first surface 73a is formed as an inclined surface that is inclined toward the downstream side in the turning direction of the outer member 70 toward the one side as proceeding outward in the radial direction. The second surface 73b is formed as an inclined surface that is inclined toward the upstream side in the turning direction of the outer member 70 toward the other side as proceeding outward in the radial direction.

The inner member 80 has an inner body 81 formed of a disk-shaped member and a groove 83 formed in the inner body 81. The inner body 81 is configured to be turnable about the axis P.

The groove 83 is a groove extending along the radial direction of the inner body 81, and is formed from one end to the other end of the inner body 81 in an extending direction of the groove 83.

An insertion hole into which the rotor shaft 62 of the rotary damper device 5 is inserted is formed in a surface of the inner member 80 opposite to a surface in which the groove 83 is formed. The axis P is the axis of the insertion hole and passes through the center of the insertion hole.

The inner member 80 is accommodated in the outer member 70 so as to be turnable about the axis P. The outer peripheral surface of the inner body 81 accommodated in the outer member 70 faces the internal teeth 73 of the outer member 70.

The inner member 80 does not have the guide piece 24 formed in the groove 23 of the inner member 20 in the first embodiment.

The slide member 90 is formed of a plate-like member, and is provided in the groove 83 of the inner member 80 so as to be slidable along the extending direction of the groove 83. That is, the slide member 90 is configured to be slidable in the radial direction of the inner member 80 perpendicular to the direction of the axis P.

The slide member 90 is configured to be turnable integrally with the inner member 80 about the axis P.

At both ends of the slide member 90 in a sliding direction, claws 91 projecting outward in the radial direction from the both ends are formed.

The claw 91 has a retreat surface 91a disposed on the upstream side in the turning direction of the outer member 70 toward the one side, and an engagement surface 91b disposed on the downstream side with respect to the retreat surface 91a in the turning direction of the outer member 70 toward the one side. The retreat surface 91a is formed as an inclined surface that is inclined toward the downstream side in the turning direction of the outer member 70 toward the one side as proceeding outward in the radial direction. The engagement surface 91b is formed as an inclined surface that is inclined toward the upstream side in the turning direction of the outer member 70 toward the other side as proceeding outward in the radial direction.

The slide member 90 is formed thinner (the dimension in the direction perpendicular to the sliding direction is smaller) than the slide member 30 in the first embodiment. The second insertion hole 32 formed in the slide member 30 in the first embodiment is not formed in the slide member 90.

Other configurations of the one-way clutch 7 are similar to the configurations of the one-way clutch 1 in the first embodiment, and thus the description thereof is omitted.

In the one-way clutch 7 of the present embodiment, the second surface 73b of the internal tooth 73 of the outer member 70 is formed as an inclined surface that is inclined toward the upstream side in the turning direction of the outer member 70 toward the other side as proceeding outward in the radial direction. The engagement surface 91b of the claw 91 of the slide member 90 is formed as an inclined surface that is inclined toward the upstream side in the turning direction of the outer member 70 toward the other side as proceeding outward in the radial direction.

Accordingly, when the outer member 70 turns toward the other side with respect to the inner member 80 and the second surface 73b of the internal tooth 73 and the engagement surface 91b of the claw 91 abut against each other, the internal tooth 73 and the claw 91 can be reliably engaged.

Effects in the Present Embodiment

In the present embodiment, the rotary damper device 100 equipped with a one-way clutch includes the following one-way clutch 1.

That is, the one-way clutch includes the inner member 20 that has the first insertion hole 21a formed along the direction of the axis P, the cylindrical outer member 10 that accommodates the inner member 20 such that the inner member 20 can turn about the axis P, and has the plurality of internal teeth 13 which project inward in the radial direction from the inner peripheral surface facing the outer peripheral surface of the inner member 20, and the slide member 30 that is provided on the inner member 20 such that the slide member 30 is slidable in the radial direction perpendicular to the direction of the axis P and has the claws 31 which project outward in the radial direction and provided at both ends in the radial direction. The dimension L between the front end of one of the claws 31 and the front end of the other of the claws 31 is greater than the diameter of the circle C that passes through the front ends of the plurality of internal teeth 13 and is centered on the axis P. The claw 31 has the retreat surface 31a that abuts against the internal tooth 13 when the outer member 10 turns toward the one side with respect to the inner member 20, and the engagement surface 31b that abuts against the internal tooth 13 when the outer member 10 turns toward the other side with respect to the inner member 20. When the internal tooth 13 and the retreat surface 31a abut against each other, the slide member 30 slides in the sliding direction, thus causing the claw 31 to retreat from the internal tooth 13, and the outer member 10 turns independently of the inner member 20. When the internal tooth 13 and the engagement surface 31b abut against with each other, the internal tooth 13 and the engagement surface 31b are engaged, and the outer member 10 and the inner member 20 integrally turn.

Thus, the internal teeth 13 of the outer member 10 and the claws 31 of the slide member 30 slidably provided on the inner member 20 allow switching between the state in which the outer member 10 and the inner member 20 are engaged with each other and the state in which the outer member 10 and the inner member 20 are not engaged with each other. Therefore, as compared to, for example, the case of configuring a one-way clutch in which a plurality of planetary gears are accommodated inside an outer member, it is possible to reduce the size of the one-way clutch 1.

Furthermore, the retreat surface 31a is formed as an inclined surface that is inclined toward the downstream side in the turning direction of the outer member 10 toward the one side as proceeding outward in the radial direction. The engagement surface 31b is formed as an inclined surface that is inclined toward the upstream side in the turning direction of the outer member 10 toward the other side as proceeding toward the surface perpendicular to the turning direction of the outer member 10 toward the other side, or as proceeding outward in the radial direction.

As a result, the claw 31 can smoothly retreat from the internal tooth 13 when the outer member 10 turns toward the one side, and the engagement state between the internal tooth 13 and the claw 31 is easily maintained when the outer member 10 turns toward the other side.

The internal tooth 13 has the first surface 13a that abuts against the claw 31 when the outer member 10 turns toward the one side with respect to the inner member 20, and the second surface 13b that abuts against the claw 31 when the outer member 10 turns toward the other side with respect to the inner member 20. The first surface 13a is formed as an inclined surface that is inclined toward the downstream side in the turning direction of the outer member 10 toward the one side as proceeding outward in the radial direction. The second surface 13b is formed as an inclined surface that is inclined toward the upstream side in the turning direction of the outer member 10 toward the other side as proceeding toward the surface perpendicular to the turning direction of the outer member 10 toward the other side, or as proceeding outward in the radial direction.

As a result, the claw 31 can further smoothly retreat from the internal tooth 13 when the outer member 10 turns toward the one side, and the internal tooth 13 and the claw 31 are reliably engaged when the outer member 10 turns toward the other side.

Furthermore, the one-way clutch 1 and the rotary damper device 5 are provided, the rotary damper device 5 including the housing 50, the rotor 60 having the rotor blade 61 turnably accommodated in the housing 50 and the rotor shaft 62 extending along the turning axis of the rotor blade 61 and inserted into the first insertion hole 21a of the one-way clutch 1, and the viscous body 56 that is enclosed in the housing 50 and imparts turning resistance to the rotor blade 61. The inner member 20 of the one-way clutch 1 and the rotor 60 of the rotary damper device 5 can integrally turn.

Since the one-way clutch 1 can be configured in a small size, it is possible to reduce the overall size of the rotary damper device 100 equipped with the one-way clutch configured by connecting the one-way clutch 1 to the rotary damper device 5 in the manner described above.

The slide member 30 has the second insertion hole 32 formed along the direction of the axis P, and the rotor shaft 62 is inserted into the second insertion hole 32.

Accordingly, the dimension of the rotary damper device 100 equipped with the one-way clutch in the direction of the axis P can be kept small.

The second insertion hole 32 has the guide surface 32a that guides the slide member 30 in the sliding direction.

As a result, it is possible to stabilize the sliding operation when the slide member 30 slides.

INDUSTRIAL APPLICABILITY

The present invention is used for the one-way clutch and the rotary damper device equipped with the one-way clutch.

REFERENCE SIGNS LIST

1 One-way clutch
5 Rotary damper device
10 Outer member
11 Outer body
12 External teeth gear
13 Internal tooth
13a First surface
13b Second surface
20 Inner member
21 Inner body
21a First insertion hole
23 Groove
24 Guide piece
30 Slide member
31 Claw
31a Retreat surface
31b Engagement surface
32 Second insertion hole
32a Guide surface
40 Lid member
50 Housing
54 Lid body
56 Viscous body
60 Rotor
61 Rotor blade
62 Rotor shaft
100 Rotary damper device equipped with one-way clutch
P Axis

The invention claimed is:
1. A rotary damper device equipped with a one-way clutch, the rotary damper device comprising:
the one-way clutch comprising:
an inner member that has a first insertion hole formed along a direction of an axis;
an outer member that has a cylindrical shape, accommodates the inner member such that the inner member is turnable about the axis, and has a plurality of internal teeth which project inward in a radial direction from an inner peripheral surface facing an outer peripheral surface of the inner member; and
a slide member that is provided on the inner member such that the slide member is slidable in the radial direction perpendicular to the direction of the axis and has claws which are provided at both ends in the radial direction and project outward in the radial direction,
wherein a dimension between a front end of one of the claws and a front end of the other of the claws is greater than a diameter of a circle that passes through front ends of the plurality of internal teeth and is centered on the axis,
each of the claws has a retreat surface that abuts against each of the plurality of internal teeth when the outer member turns toward one side with respect to the inner member, and an engagement surface that abuts against each of the plurality of internal teeth when the outer member turns toward the other side with respect to the inner member, and
when each of the plurality of internal teeth and the retreat surface abut against each other, the slide member slides in a sliding direction to cause each of the claws to retreat from each of the plurality of internal teeth, and the outer member turns independently of the inner member, and when each of the plurality of internal teeth and the engagement surface abut against each other, each of the plurality of internal teeth and the engagement surface are engaged with each other and the outer member and the inner member integrally turn,
the rotary damper device that includes a housing, a rotor having a rotor blade that is turnably accommodated in the housing and a rotor shaft that extends along a turning axis of the rotor blade and is inserted into a first insertion hole of the one-way clutch, and a viscous body that is enclosed in the housing and imparts turning resistance to the rotor blade,
wherein the inner member of the one-way clutch and the rotor of the rotary damper device are integrally turnable,
wherein the slide member has a second insertion hole formed along the direction of the axis,
the rotor shaft is inserted into the second insertion hole, and
the inner member further includes a guide piece extending from an inner side of the first insertion hole and overlapping the slide member in the direction of the axis.
2. The rotary damper device equipped with the one-way clutch according to claim 1,
wherein the retreat surface is formed as an inclined surface that is inclined toward a downstream side in a turning direction of the outer member toward the one side as proceeding outward in the radial direction, and
the engagement surface is formed as an inclined surface that is inclined toward an upstream side in a turning direction of the outer member toward the other side as proceeding toward a surface perpendicular to the turning direction of the outer member toward the other side or as proceeding outward in the radial direction.

3. The rotary damper device equipped with the one-way clutch according to claim 1,
  wherein each of the plurality of internal teeth has a first surface that abuts against each of the claws when the outer member turns toward the one side with respect to the inner member, and a second surface that abuts against each of the claws when the outer member turns toward the other side with respect to the inner member,
  the first surface is formed as an inclined surface that is inclined toward the downstream side in the turning direction of the outer member toward the one side as proceeding outward in the radial direction, and
  the second surface is formed as an inclined surface that is inclined toward the upstream side in the turning direction of the outer member toward the other side as proceeding toward a surface perpendicular to the turning direction of the outer member toward the other side or as proceeding outward in the radial direction.

4. The rotary damper device equipped with the one-way clutch according to claim 2,
  wherein each of the plurality of internal teeth has a first surface that abuts against each of the claws when the outer member turns toward the one side with respect to the inner member, and a second surface that abuts against each of the claws when the outer member turns toward the other side with respect to the inner member,
  the first surface is formed as an inclined surface that is inclined toward the downstream side in the turning direction of the outer member toward the one side as proceeding outward in the radial direction, and
  the second surface is formed as an inclined surface that is inclined toward the upstream side in the turning direction of the outer member toward the other side as proceeding toward a surface perpendicular to the turning direction of the outer member toward the other side or as proceeding outward in the radial direction.

5. The rotary damper device equipped with the one-way clutch according to claim any one of claims 1 to 4,
  wherein the second insertion hole has a guide surface that guides the slide member in the sliding direction.

6. A rotary damper device equipped with a one-way clutch, the rotary damper device comprising:
  the one-way clutch comprising:
    an inner member that has a first insertion hole formed along a direction of an axis;
    an outer member that has a cylindrical shape, accommodates the inner member such that the inner member is turnable about the axis, and has a plurality of internal teeth which project inward in a radial direction from an inner peripheral surface facing an outer peripheral surface of the inner member; and
    a slide member that is provided on the inner member such that the slide member is slidable in the radial direction perpendicular to the direction of the axis and has claws which are provided at both ends in the radial direction and project outward in the radial direction,
  wherein a dimension between a front end of one of the claws and a front end of the other of the claws is greater than a diameter of a circle that passes through front ends of the plurality of internal teeth and is centered on the axis,
  each of the claws has a retreat surface that abuts against each of the plurality of internal teeth when the outer member turns toward one side with respect to the inner member, and an engagement surface that abuts against each of the plurality of internal teeth when the outer member turns toward the other side with respect to the inner member, and
  when each of the plurality of internal teeth and the retreat surface abut against each other, the slide member slides in a sliding direction to cause each of the claws to retreat from each of the plurality of internal teeth, and the outer member turns independently of the inner member, and when each of the plurality of internal teeth and the engagement surface abut against each other, each of the plurality of internal teeth and the engagement surface are engaged with each other and the outer member and the inner member integrally turn,
  the rotary damper device that includes a housing, a rotor having a rotor blade that is turnably accommodated in the housing and a rotor shaft that extends along a turning axis of the rotor blade and is inserted into a first insertion hole of the one-way clutch, and a viscous body that is enclosed in the housing and imparts turning resistance to the rotor blade,
  wherein the inner member of the one-way clutch and the rotor of the rotary damper device are integrally turnable,
  wherein a groove is formed in the inner body and a width of the groove increases toward an outer side in a peripheral portion of the groove.

* * * * *